(12) United States Patent
Klosa et al.

(10) Patent No.: US 7,172,128 B2
(45) Date of Patent: Feb. 6, 2007

(54) METHOD FOR OPERATING NON-CONTACT IDENTIFICATION MEDIA

(75) Inventors: Klaus Ulrich Klosa, Grüningen (CH); Guy Petignat, Herrliberg (CH)

(73) Assignee: Legic Identsystems AG, Wetzikon (CH)

( * ) Notice: Subject to any disclaimer, the term of this patent is extended or adjusted under 35 U.S.C. 154(b) by 107 days.

(21) Appl. No.: 10/468,495

(22) PCT Filed: Feb. 25, 2002

(86) PCT No.: PCT/CH02/00107

§ 371 (c)(1),
(2), (4) Date: Sep. 15, 2003

(87) PCT Pub. No.: WO02/069285

PCT Pub. Date: Sep. 6, 2002

(65) Prior Publication Data

US 2004/0094625 A1 May 20, 2004

(30) Foreign Application Priority Data

Feb. 26, 2001 (CH) .................................. 0337/01

(51) Int. Cl.
*G06K 19/06* (2006.01)

(52) U.S. Cl. .................. 235/492; 235/380; 235/382; 235/486; 235/487

(58) Field of Classification Search ............... 235/492, 235/486, 382
See application file for complete search history.

(56) References Cited

U.S. PATENT DOCUMENTS 6,216,954 B1 * 4/2001 Kuwamoto et al. ......... 235/486
6,259,769 B1 * 7/2001 Page et al. .................. 235/375
6,769,607 B1 * 8/2004 Pitroda et al. .............. 235/380

FOREIGN PATENT DOCUMENTS

EP 0 933 733 A2 8/1999
EP 1 096 422 A1 5/2001

OTHER PUBLICATIONS

WO 00/67100, Portable Smart Card Communication Device, Publication Date: Nov. 9, 2000.

* cited by examiner

*Primary Examiner*—Seung Ho Lee
(74) *Attorney, Agent, or Firm*—Rankin, Hill, Porter & Clark LLP (57) ABSTRACT

For operation of contact-less identification media in a system with contact applications for contact cards, an initialized converter module is connected in series as a read/write station. This converter module, on the one hand, executes a contact-less communication with initialized contact-less identification media and, on the other hand, a contact communication at a contact card interface to a host computer or to an application computer for the communication with a contact application of the system and the converter module translates the contact-less communication with respect to communication rules and information into a contact communication with contact information and vice versa and the initialization of the converter module is defined in a hierarchic authorization system. This makes possible a particularly simple and efficient introduction of contact-less identification media into existing contact card systems and—installations.

35 Claims, 8 Drawing Sheets

METHOD FOR OPERATING NON-CONTACT IDENTIFICATION MEDIA

BACKGROUND OF THE INVENTION

The present invention relates to a method for operating contact-less identification media in a system with contact applications for contact cards, a converter module for contact-less communication and an installation having contact-less communication with contact-less identification media. Contact card systems with contact identification media are widely utilized and are known for various applications, e.g., as access cards for certain zones within a company, for time management, as access media for the use of devices, e.g., data facilities, as credit cards and also as check or value cards for obtaining various types of services.

Increasingly, there is the requirement or the demand to also be in a position to utilize contact-less identification media in such contact card systems, in order to be able to exploit their great advantages above all with respect to handling, as well as with regard to possible extensions of applications.

For this purpose, up until the present moment, a contact-less RF—application with RF—reading stations for contact-less communication had to be integrated into the system. This calls for a communication interface to the existing contact system in the host and to local control devices of the contact applications at the read/write stations, the specific commands of the RF—reading stations have to be programmed, and the physical integration of the RF—system, including power supply terminals, has to be implemented.

With this, the effort and expenditure for additional RF—reading stations of this kind becomes relatively great and correspondingly expensive.

Another possibility for the introduction of contact-less identification media is the utilization of hybrid media, which contain both communication types. Here, in principle, a contact card for a contact communication system is integrated into a card in the format of the contact card with a contact-less identification system for contact-less communication. Hybrid cards of this kind, with a dual function, however, are sophisticated and relatively expensive. In addition, the problem of servicing and maintaining two different systems in the host still remains.

SUMMARY OF THE INVENTION

It is now the objective of the present invention to create a much simpler and cheaper complement for contact card systems with contact-less identification media and to indicate methods and devices, which with much less effort and expenditure make the utilization of contact-less identification media in such a system possible and which also enable a step-by-step transformation into a contact-less system.

This objective is achieved with a method and device in accordance with the present invention.

With the initialized converter module, the communication with the initialized contact-less identification media is transformed or translated into a contact communication, which at the interface to the host computer precisely corresponds to the contact communication and—information of the system up until now, i.e., at the interface S for the system, an identical communication as with the contact cards appears. With this, the contact reading devices and the interface to the host also for contact-less identification media receive exactly the same communication as for contact cards, i.e., on the side of the existing system with host, contact application, contact reading devices and contact operating systems no modifications are necessary. The contact card operating system here in principle is integrated into the converter module.

BRIEF DESCRIPTION OF THE DRAWINGS

In the following, the invention is further explained on the basis of Figures and examples. These illustrate.

DETAILED DESCRIPTION OF THE PREFERRED EMBODIMENTS

The FIGS. 1a–3a illustrate the method in accordance with the invention for the operation of initialized contact-less identification media RF-IM in a contact card system by means of an initialized converter module C-RF for the translation of the contact-less communication K-RF with the identification medium into the contact communication K-C of the contact card system.

Figure 1A:
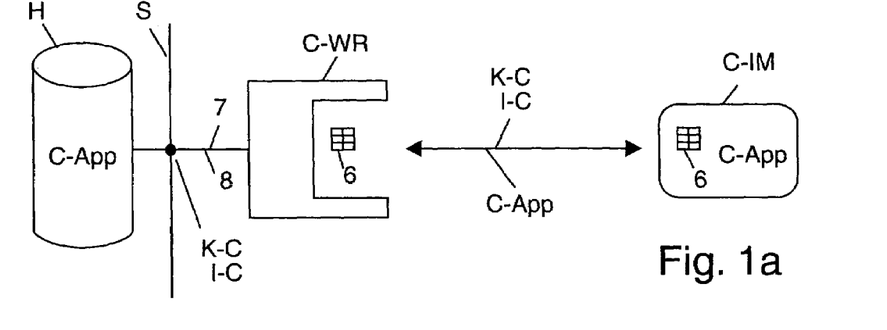
FIG. 1a a system with host, contact card read/write station, contact cards and interface in between with corresponding contact communication, FIG. 2a a complement in accordance with the invention with an initialized converter module for the communication with initialized contact-less identification media on the one hand and with a contact card read/write station on the other hand, FIG. 3a an initialized read/write station with a converter module for the communication with contact-less identification media and with a contact interface to the host, FIG. 4a a system with a read/write station for the communication with contact applications as well as with contact-less applications in contact-less identification media, FIGS. 1b–4b variants with an integrated applications computer in the reading stations and with a temporary connection to the host, FIG. 5a the structure of a converter module with an RF—transmitter/receiver as a plug-in module into a contact card read/write station, FIG. 5b the structure of a contact-less read/write station with integrated converter module and an applications computer as well as with an additional contact-less communication for contact-less applications, FIG. 6 an assigned contact-less identification medium with several independent applications, FIG. 7 variants of the origin of contact applications for registration into contact-less identification media, FIG. 8 an authorization read/write station for the registration of contact applications by means of a contact-less authorization medium, FIG. 9 an authorization read/write station for the registration of contact applications by means of a contact authorization medium, FIG. 10 an authorization read/write station for the registration of contact applications by means of a built-in authorization element, FIG. 11 a converter module, which is integrated into an applications computer, FIGS. 12a–c various possibilities for the initialization of converter modules or of read/write stations with converter module, FIG. 13 initializations of contact-less identification media, converter modules, plug-in modules and read/write stations in general, as well as with the framework of authorization—and sub-authorization systems, FIG. 14 an installation with contact applications, contact card communication, contact media, converter modules and contact-less identification media as well as with additional contact-less applications, contact-less communication and contact-less reading stations.

FIG. 1a depicts a contact card system of the familiar kind with contact card read/write stations C-WR and assigned contact identification media C-IM as application media, both of which comprise contacts 6 as well as with a contact card interface S and a connection to a host computer H, which contains contact applications C-App. From the contact medium C-IM through the reading station C-WR, up to the host H, to an application in an application computer App-uP (FIG. 1b), the communication takes place as contact communication K-C with contact information I-C.

Figure 2A:
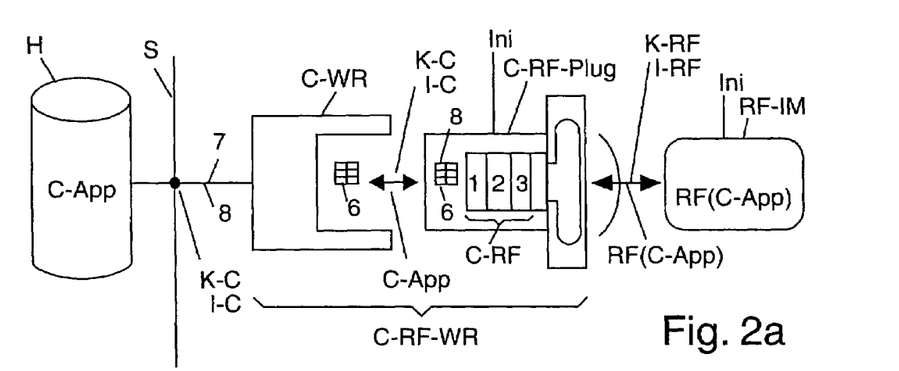
Figure 3A:
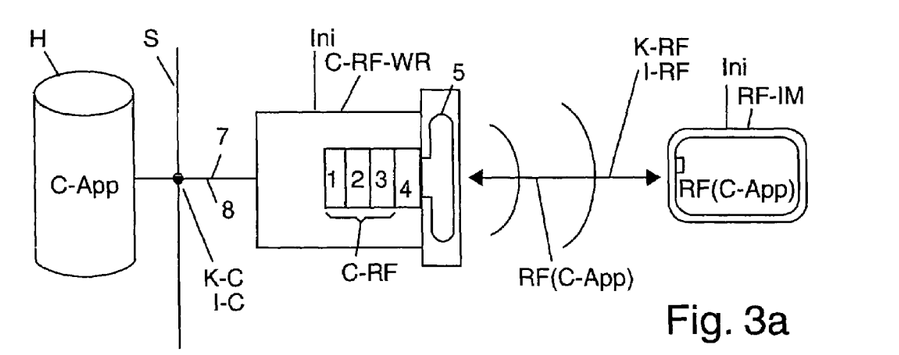

In accordance with the present invention, an initialized converter module C-RF is interposed in series (as shown in FIGS. 2a, 3a), in order for existing contact systems with contact cards C-IM (additionally and alternatively) to also be in a position to utilize contact-less identification media RF-IM as application media (with all their well known advantages and extended application possibilities). The initialized converter module C-RF, on the one hand carries out an RF—communication K-RF with initialized contact-less identification media RF-IM and, on the other hand, implements a contact communication K-C at a contact card interface S to a host computer H or to an application computer App-uP of a contact read/write station C-WR for the communication with a contact application C-App of the system. The initialized converter module C-RF translates the contact-less communication K-RF with respect to communication rules and information I-RF into a contact communication K-C with contact information I-C and vice versa.

With this, the contact card operating system in principle (at least partially) is integrated into the converter module. The initialization of the converter module C-RF is defined, administered and executed within the scope of a hierarchic authorization system.

An embodiment of the foregoing is illustrated in FIG. 2a, wherein the converter module C-RF is implemented as an initialized (Ini) plug-in module C-RF-Plug with contacts 6. This plug-in module is capable of being plugged into an existing read/write station and is simultaneously designed as a contact-less read/write station for the communication with initialized (Ini) contact-less identification media RF-IM. The contact takes place through the contacts 6 of the contact reading station C-WR and of the plug-in module C-RF-Plug. In the plugged-in condition, the plug-in module and the contact reading station together form an initialized contactless read/write station C-RF-WR. With this arrangement, for carrying out a contact application C-App, the corresponding contact communication K-C and—information I-C is translated by the converter module C-RF into the contact-less RF—language: C-App in RF(C-App) and transmitted to the contact-less identification media RF-IM as a contact-less communication K-RF, I-RF.

During the step-by-step introduction of additional contact-less identification media RF-IM, already existing contact card read/write stations C-WR with plug-in modules C-RF-Plug may, as required, be utilized both for contact card C-IM as well as for contact-less media RF-IM. For example, in a shopping center, with several cash register terminals, which are equipped with contact card reading stations C-WR, for the step-by-step introduction of contact-less identification media, individual cash register terminals may be retrofitted by means of the plug-in modules C-RF-Plug, i.e., the more purchasers want to pay with contact-less identification media, the more correspondingly retrofitted contact-less read/write stations may be made available in a simple manner.

The initialized plug-in module C-RF-Plug may also be implemented in two parts, with a first part, which is completely introduced into a contact card read/write station C-WR and a second part, which is affixed to the outside of the reading station C-WR and which carries out the communication K-RF with the contact-less identification media RF-IM.

Figure 5A:
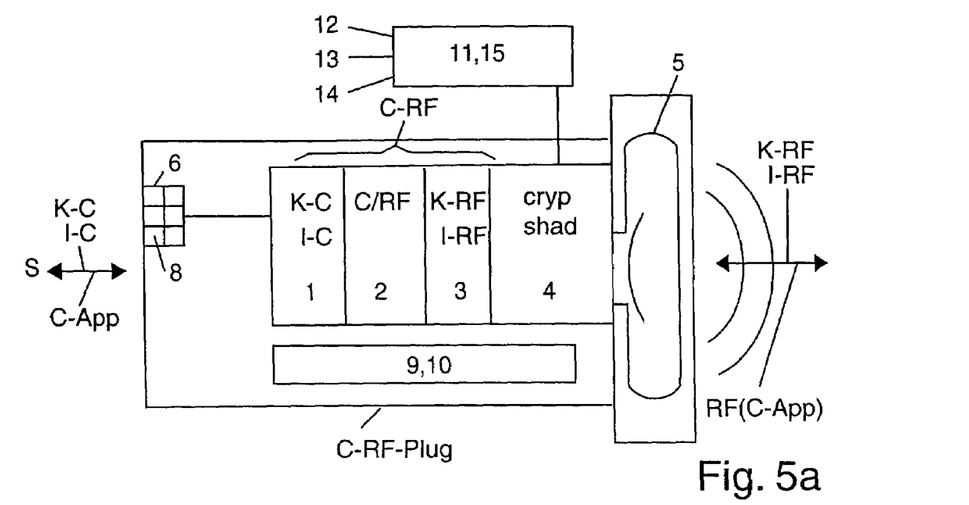
Figure 5B:
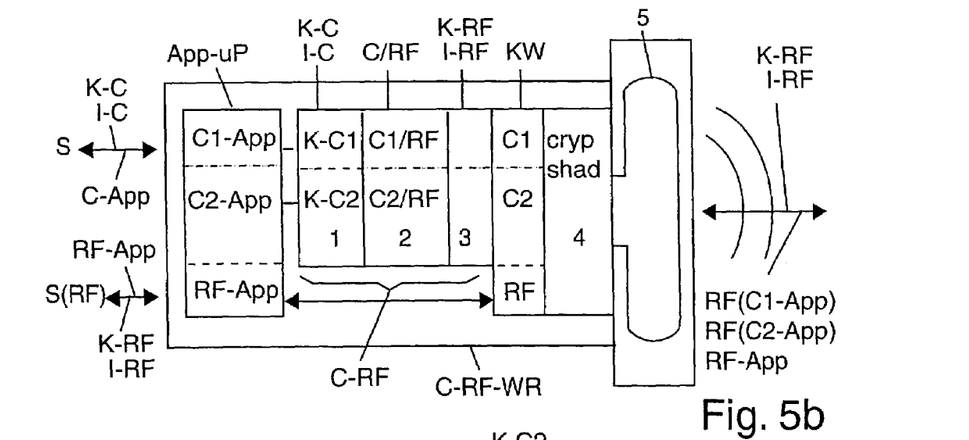

FIG. 3a, as a further embodiment, illustrates a converter module C-RF, which by means of connections 7 is directly connected to the interface S with the contact communication K-C, I-C and which together with an integrated RF—transmitter/receiver forms an initialized (Ini) contact-less read/write station C-RF-WR. The design of the converter module C-RF and of the contact-less read/write station C-RF-WR is further explained in connection with FIG. 5.

The initialization Ini for the generation of the compatibility of contact system C and contact-less system RF has to be implemented on the identification media RF-IM and at the RF—reading stations, i.e., on the converter module C-RF itself or else at the read/write stations C-RF-WR formed together with it or on the plug-in modules C-RF-Plug. This initialization is explained in further detail in connection with the Figures FIGS. 12 and 13.

Figure 1B:
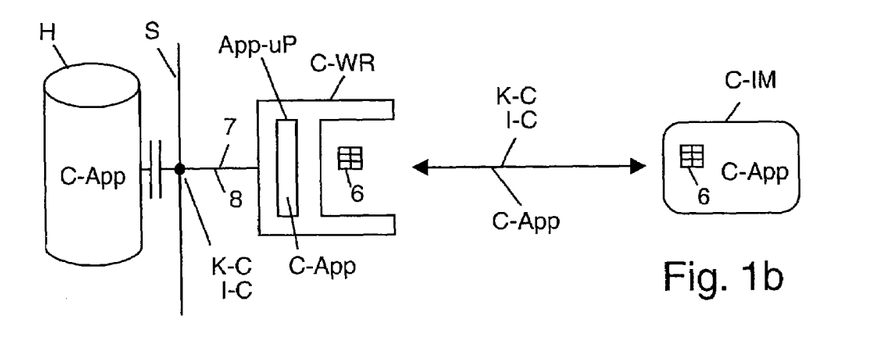
Figure 2B:
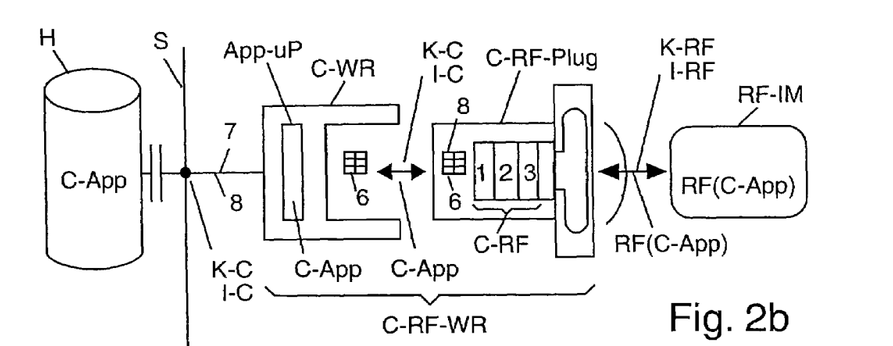
Figure 3B:
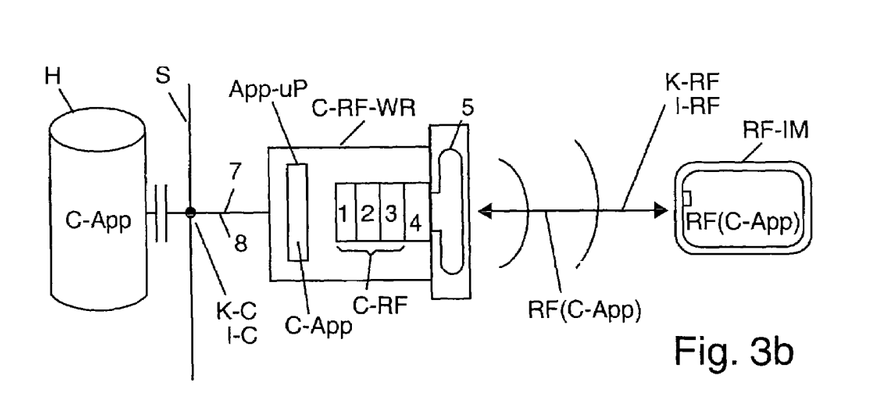

FIGS. 1b–3b illustrate analogous examples to the FIGS. 1a–3a, wherein, however, here an application computer App-uP is assigned to the C-RF for the execution of an application C-App independent of a direct on-line connection to a host H and for the execution of decentralized local functions of an application C-App     at a station with an initialized plug-in module C-RF-Plug in accordance with FIG. 2b,—or at an initialized contact-less read/write station C-RF-WR in accordance with FIG. 3b.

Figure 4A:
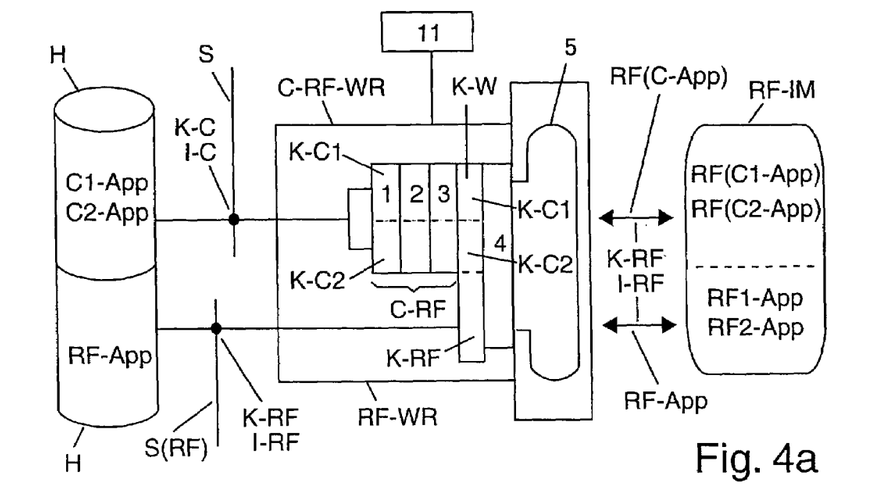

FIG. 4a illustrates a converter module C-RF in a contactless read/write station C-RF-WR, which comprises additional means for contact-less communication K-RF, I-RF with contact-less applications RF-App at an interface S(RF), e.g., to a host H with contact-less applications RF-App. If so required, the converter module C-RF is also capable of processing several types of contact communications (with different contact operating systems), e.g., two types of contact communication K-C1 and K-C2. For this purpose, the converter module C-RF also comprises means KW for the selection of the type of communication between different contact communications K-C1, K-C2 and contact-less communication K-RF. With the means of selection KW, it is assured that the correctly required type of communication in both directions, i.e., from the host to the identification medium RF-IM, as well as from the identification medium to the host, respectively, to the application is selected, translated and transmitted. Different types of RF—communication K-RF1, K-RF2 are also possible.

In doing so, the selection of the type of communication may take place automatically in correspondence with the type of application (C1-App, C2-App, RF1-App, RF2-App) or else it may also be settable.

The selection of the type of communication may take place in correspondence with a request from the side of the host H or from the application computer App-uP and, on the other hand, it may also take place in correspondence with a request from the side of the identification medium RF-IM.

Different operating systems K-C1, K-C2 may, e.g., be utilized by different providers of check—or value—or credit cards (of Bank1, Bank2, post) or also of companies for proprietary company applications (access, IT—access, canteen etc.).

The example of FIG. 4a illustrates the three types of communication K-C1, K-C2, K-RF with corresponding applications C1-App, C2-App and RF-App in a host H. The means of selection KW here ensures, that the contact applications C1-App, C2-App with the contact communication types K-C1, K-C2 are translated into the RF—language and are transmitted to the contact-less identification medium RF-IM in RF—communication as RF(C1-App), resp., RF(C2-App) and vice versa. A contact-less application RF-App with contact-less communication K-RF and I-RF at an interface S(RF) to a host in contrast does not require any translation. There for the execution of an RF—application the contact-less communication K-RF, I-RF is directly passed on in both directions by the communication selection means KW.

Advantageously, contact systems make use of standardized types of communication. In doing so, the converter module C-RF is driven from a contact application C-App from an assigned host H or an application computer App-uP according to the rules and protocols of a standardized contact communication K-C with standardized contact information I-C and the converter module C-RF responds to the contact application C-App in accordance with the same rules and protocols.

The converter module C-RF may be driven and may respond according to standardization protocols in accordance with national or international organizations, such as ISO, IEC, IEEE, ANSI, CEN or CENELEC.

Figure 4B:
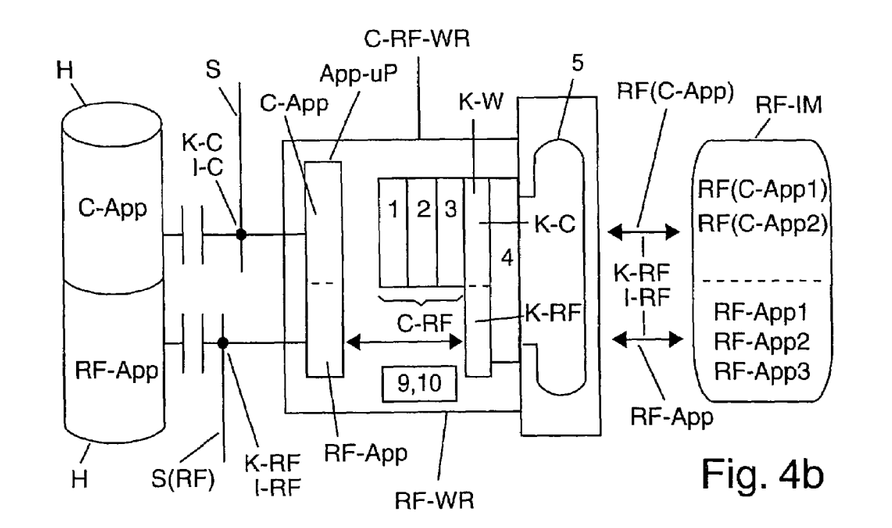

FIG. 4b illustrates an example with an application computer App-uP in the contact-less read/write station C-RF-WR with a temporary connection to a host H, wherein the applications of the application computer App-uP are capable of being carried out in a decentralized manner, i.e., independent of the host H. This example comprises a type of contact communication K-C with several applications C-App1, C-App2 and a type of RF—communication K-RF with several applications RF-App1, RF-App2, RF-App3. The means of selection KW, therefore, differentiates between the communication types K-C and K-RF.

The FIGS. 5a and 5b illustrate the structure of a converter module C-RF in accordance with the invention. The converter module comprises three parts:

on the one hand, a part 1, which carries out a contact communications K-C, I-C at a contact card interface S to a host computer H or to an application computer App-uP of a read/write station C-WR,—on the other hand, a part 3, which carries out the contact-less communication K-RF, I-RF to the contact-less identification media RF-IM,—and comprises a part 2 as translation part C/RF, which translates the contact-less communication K-RF, I-RF into the contact communication K-C, I-C.

For the implementation of the contact-less communication K-RF with the contact-less identification media RF-IM, the converter module C-RF also comprises an RF—transmitter/receiver 4 with an antenna 5.

The example of FIG. 5a depicts a converter module C-RF in a plug-in module C-RF-Plug with contacts 6, adapted to a desired contact read/write station C-WR.

The example of FIG. 5b illustrates a converter module C-RF in a contact-less read/write station C-RF-WR with an integrated application computer App-uP, as well as, for example, with two types of contact communication K-C1, K-C2 as well as with an RF—communication K-RF for corresponding applications.

The converter module C-RF with the parts 1=C communication part, 2=C/RF translation part and 3=RF communication part does not have to be implemented as a functional component. These parts 1, 2, 3 may also be implemented as separate components, if so required, comprising several sub-components. For example, the part 3 or also the parts 3 and 4 may form a component. In doing so, the part 3 may also process initialization information Ini-I, Ini-A-I, resp., contain it and with this ensure the compliance with the initialization standards and the rules of the authorization system A (refer to FIGS. 12 and 13).

Figure 6:
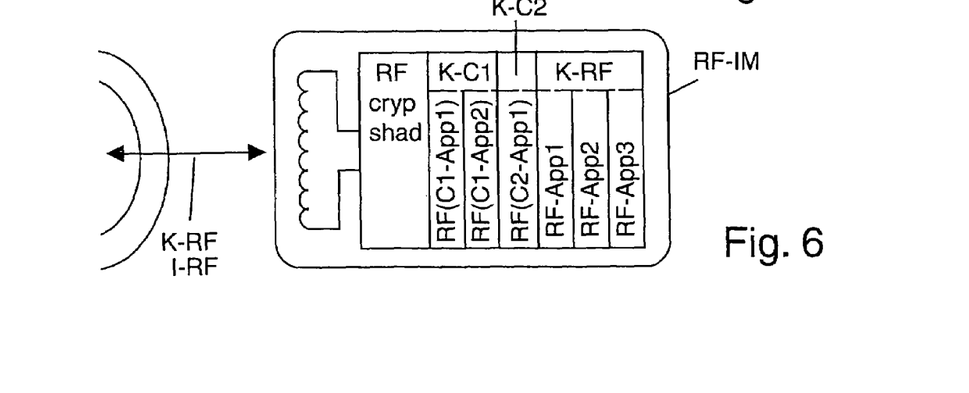

FIG. 6 illustrates an assigned contact-less identification medium RF-IM, which in its memory contains several independent applications. Here, for example, two types of contact communications K-C1, K-C2 with contact applications in RF—language RF(C1-App1), RF(C1-App2) and RF(C2-App1) as well as the contact-less applications: RF-App1, RF-App2, RF-App3 in RF—communication K-RF.

For safeguarding the contact-less communication K-RF with the transmitted information I-RF between the converter module C-RF and the contact-less identification media RF-IM, an encryption cryp of the communication K-RF is preferably implemented.

For writing processes in case of the contact-less communication K-RF from the converter module C-RF to the contact-less identification media RF-IM, a shadow memory shad is preferably utilized in the identification media and on the converter module, as is illustrated in the FIGS. 5 and 6.

The encryption cryp serves for safeguarding against unauthorized monitoring and unauthorized intervention by third parties. With the shadow memory shad, it is assured that a writing process is carried out completely and correctly (or not at all) and that, e.g., in case of an interruption of the communication no data loss or errors are produced. These methods are described, e.g., in the WO 97/34265.

The FIGS. 4a and 5a depict contact-less read/write stations with an energy store 9 and a power amplifier 10, which are assigned to the converter module C-RF. This makes higher transmission powers possible and also enables the decentralized, autonomous operation of contact-less read/write stations. In FIG. 5a, the power supply 8 of the plug-in module C-RF-Plug is preferably implemented through the contacts 6 to the contact card reading station C-WR. In doing so, frequently only a relatively low power is able to be drawn. For the communication with the contact-less identification media RF-IM and the execution of an application, however, a higher power may be necessary or desirable. For this purpose, the energy store 9 is provided, which during the transmission breaks continually collects energy. With a power amplifier 10, the required higher transmission power for the contact-less communication and for the execution of applications is able to be produced.

The converter module or the read/write station may also include means for autonomous power supply, such as batteries or solar cells. With this, e.g., a decentralized station, which includes an application computer App-uP with an application, such as, e.g., in FIG. 4b, is also able to be operated offline. In this, local functions may be contained in the applications computer and basic functions in the host.

For the execution of applications, corresponding dialogue devices 11 may be assigned to the converter modules C-RF or to the contact-less read/write stations, as is illustrated in FIGS. 4a and 5a, e.g., a display 12, an input keyboard 13, biometric sensors and identification elements 14 and also PIN—codes 15 for access authorizations. The example of FIG. 5a depicts a plug-in module C-RF-Plug with dialogue devices 11. These dialogue devices and the assigned applications may also extend beyond the functions of the contact card read/write stations C-WR, into which this plug-in module is plugged, i.e., also new and extended functions or dialogue devices are possible.

Figure 7:
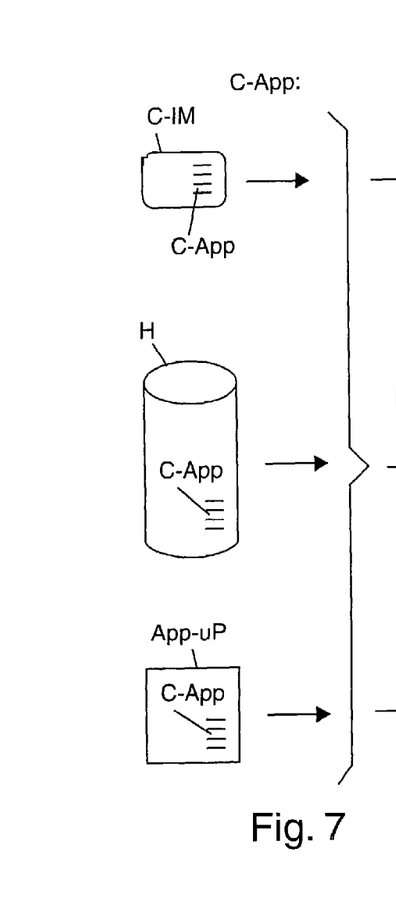

With the Figures FIGS. 7–10, the registration or initialization of new, changed or extended contact applications C-App in contact-less identification media RF-IM is illustrated. For this registration, an authorizing read/write station A-C-RF-WR (or an initializing read/write station) with a converter module, an authorization element AE as well as with authorization information A-I are employed. The rules for the registration, resp., initialisation of new applications and new identification media are defined in an authorization system (described in conjunction with FIGS. 13, 14). FIG. 7 illustrates the possible origin of such new applications for registration in the contact-less identification media RF-IM. These new applications C-App may, e.g., be stored in a contact identification medium C-IM, in a host H or also in an application computer App-uP.

Figure 8:
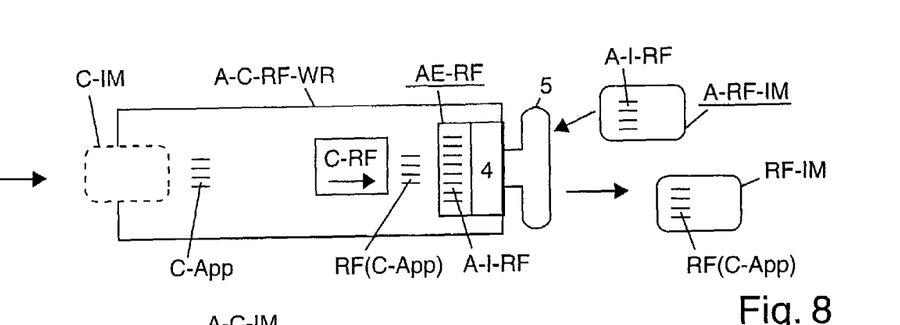
Figures 9, 10:
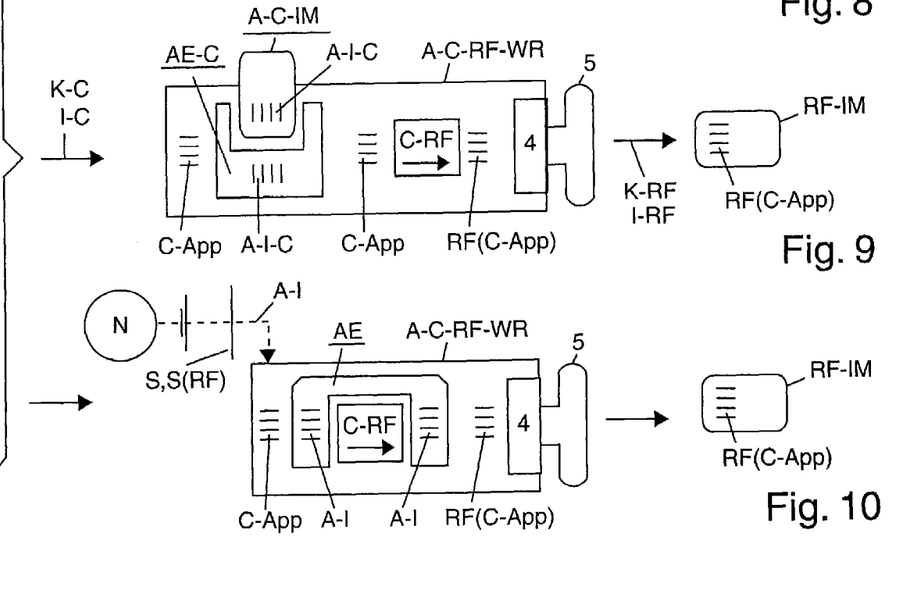

FIGS. 8–10 illustrate possible embodiments for the registration or initialization of new applications. In accordance with the example of FIG. 8, the authorization information A-I is contained in a mobile, contact-less authorization medium A-RF-IM and from there are transferred to an authorization element AE-RF of the authorization read/write station A-C-RF-WR. By means of this authorization information A-I and the authorization element AE, a new contact application C-App is subsequently translated into the contact-less communication K-RF, I-RF in the converter module C-RF and registered in the contact-less identification medium RF-IM as a translated contact application RF(C-App).

FIG. 9 depicts an example, in the case of which the authorization information A-I is transferred into an authorization element AE-C of the authorization read/write station A-C-RF-WR by means of a mobile contact authorization medium A-C-IM.

FIG. 10 illustrates a further embodiment, in the case of which an authorization element AE, which contains the authorization information A-I, is built into or integrated with the authorization read/write station A-C-RF-WR. FIG. 10 also depicts a further embodiment, in the case of which the authorization information A-I is transferred to the authorization read/write station A-C-RF-WR through a network N. It may also be transferred through a secure private or with the corresponding encryption also through a public network N.

As these different possibilities manifest, depending on the requirements and the application, a particularly suitable embodiment may be selected for the initialization or the registration of new applications. Of course, combinations of these are also conceivable, e.g., that a part of the authorization information A-I is fed-in through a network N from a central station, while the remainder of the authorization information, e.g., is fed-in locally with an authorization medium.

Figure 11:
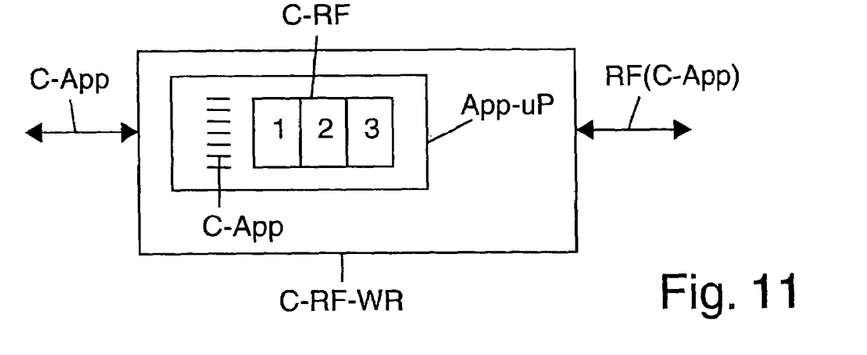

FIG. 11, as a further particularly efficient embodiment of the invention, illustrates a contact-less read/write station C-RF-WR with an application computer, wherein the converter module C-RF is integrated into the application computer App-uP, instead of using two necessary separate computing chips. This makes a particularly cheap, efficient and space-saving manufacture possible. In this embodiment, the application computer is also capable of containing applications C-App.

Figure 12A:
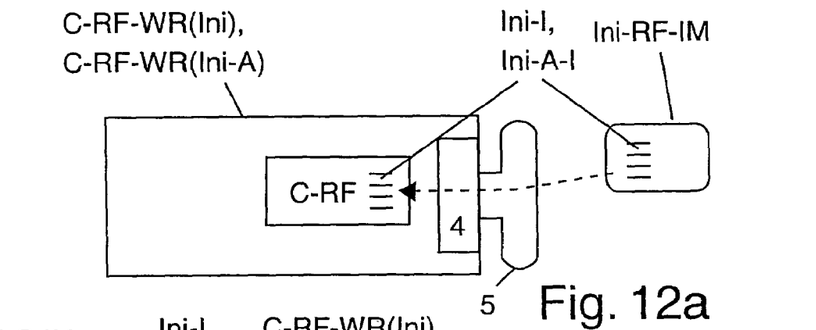
Figure 12B:
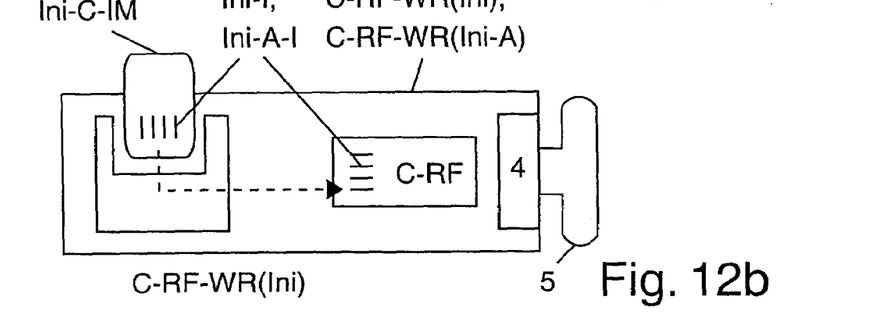
Figure 12C:
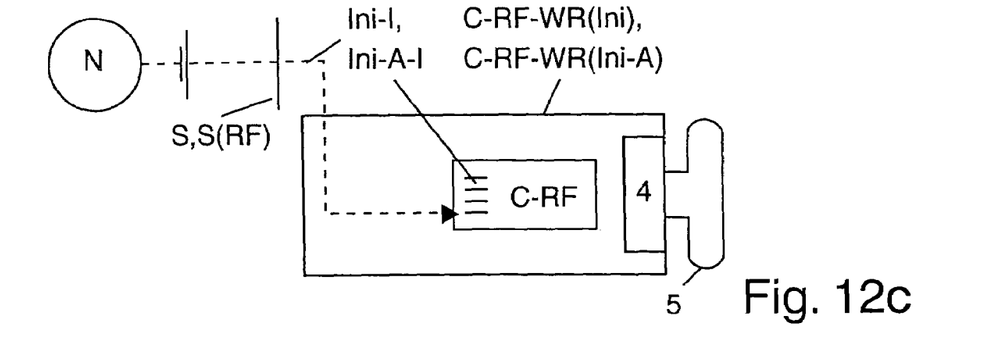

Regarding FIG. 12: With the initialization of contact-less identification media RF-IM and of the reading stations C-RF-WR C-RF-Plug, the compatibility of the contact system C and the contact-less system RF is established.

FIGS. 12a, b, c illustrate various possibilities for the initialization of reading stations C-RF-WR and plug-in modules C-RF-Plug or of converter modules C-RF. In these embodiments, the initialization may be contained in the converter module C-RF itself or in the complete reading station C-RF-WR, C-RF-Plug. In accordance with FIG. 12a, this initialization Ini may take place through a contact-less initialization identification medium Ini-RF-IM, from which the initialization information Ini-I is registered in the reading station C-RF-WR. With general initialization information Ini-I, which is not defined within the scope of an authorization system A, the read/write station becomes an initialized read/write station C-RF-WR(Ini). With initializations, which are defined and administered within the scope of a hierarchical authorization system A, the read/write station through corresponding initialization information Ini-A-I becomes an initialized read/write station C-RF-WR(Ini-A).

In accordance with FIG. 12b, the initialization takes place through an initialization contact medium Ini-C-IM.

According to FIG. 12c, the initialization of the read/write station C-RF-WR may also take place through a network N, through which the initialization information Ini-I or Ini-A-I is transferred into the read/write stations C-RF-WR.

Figure 13:
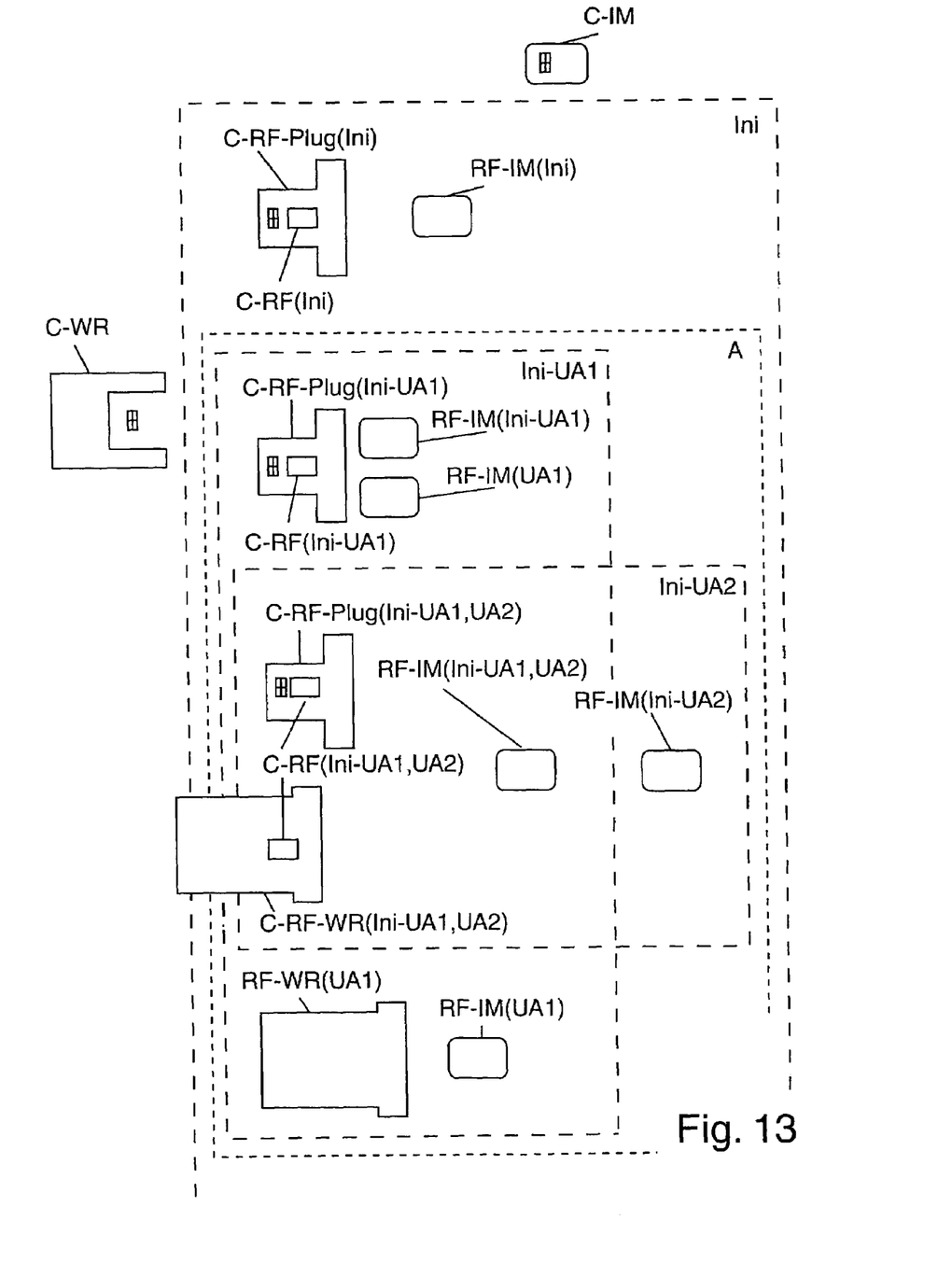

FIG. 13 illustrates the initialization of contact-less identification media RF-IM as well as of the reading stations, i.e., of converter modules C-RF or plug-in modules C-RF-Plug and read/write stations C-RF-WR. These initializations Ini may represent general system initializations or may take place within the scope of a hierarchical authorization system A (refer to FIGS. 12a–c) and furthermore also within the scope of sub-authorization systems UA.

In this example, two sub-authorization systems UA1 and UA2 within the scope of the authorization system A are depicted.

FIG. 13 in a sequence from top to bottom illustrates:

A general initialization Ini (which does not take place within the scope of the authorization system A) of a plug-in module C-RF-Plug(Ini) for the communication with contact-less identification media RF-IM(Ini). A general initialization of this kind may, e.g., take place through unique production numbers of the identification media RF-IM and of the reading stations C-RF-WR and C-RF-Plug.

An initialization Ini-UA1 of a plug-in module C-RF-Plug (Ini-UA1) of the converter module C-RF(Ini-UA1) within the scope of the authorization system A and of the sub-authorization system UA1 for the communication with identification media RF-IM(Ini-UA1) and also with identification media RF-IM(UA1), which already prior to the extension of the contact system C are utilized within a contact-less system RF within the scope of the sub-authorization system UA1 and which therefore are already implicitly initialized.

An additional initialization Ini-UA2 within the scope of a second sub-authorization system UA2, wherein here a plug-in module C-RF-Plug(Ini-UA1, UA2) and a read/write station C-RF-WR(Ini-UA1, UA2) are initialized within the scope of both sub-authorization systems UA1 and UA2. The example in this context illustrates an identification medium RF-IM(Ini-UA1, UA2), which is initialized within the scope of UA1 and UA2 as well as an identification medium RF-IM(Ini-UA2), which is only initialized within the scope of the sub-authorization system UA2.

And at the bottom a pure contact-less read/write station RF-WR(UA1) and a corresponding identification medium RF-IM(UA1), which communicate within the contact-less system RF, not, however, with the contact system C.

Application Example:

Two independent users want to equip an existing contact system with additional contact-less identification media RF-IM, corresponding applications and with plug-in modules C-RF-Plug. Assigned to each of these independent users, respectively, is a sub-authorization system UA1, UA2, in which they are able to design their respective independent applications App1 in UA1 and App2 in UA2.

They have introduced two new customer bonus applications App1 in UA1 and App2 in UA2. In addition, it shall be determined that the discount in the case of the application App 2 is greater, if a customer also participates in the application App1, not, however, vice-versa. Customers, who only participate in the App1, therefore do not need cards with App2, i.e., identification media RF-IM(App1/UA1) are sufficient. Correspondingly, all those businesses may be equipped with plug-in modules C-RF-Plug(UA1, UA2), which within the scope of both sub-authorization systems are initialized or businesses may also be equipped with plug-in modules in accordance with requirements, which are only authorized within the scope of one sub-authorization system UA. The initialization within the scope of only one sub-authorization system forms an additional security measure for maintaining the independence of the applications. This would also make it possible to provide all customers with identification media RF-IM(App1/UA1, App2/UA2), which are initialized within the scope of both sub-authorization systems, because it is cheaper to re-equip the reading stations C-RF-Plug than a large number of identification media RF-IM.

Figure 14:
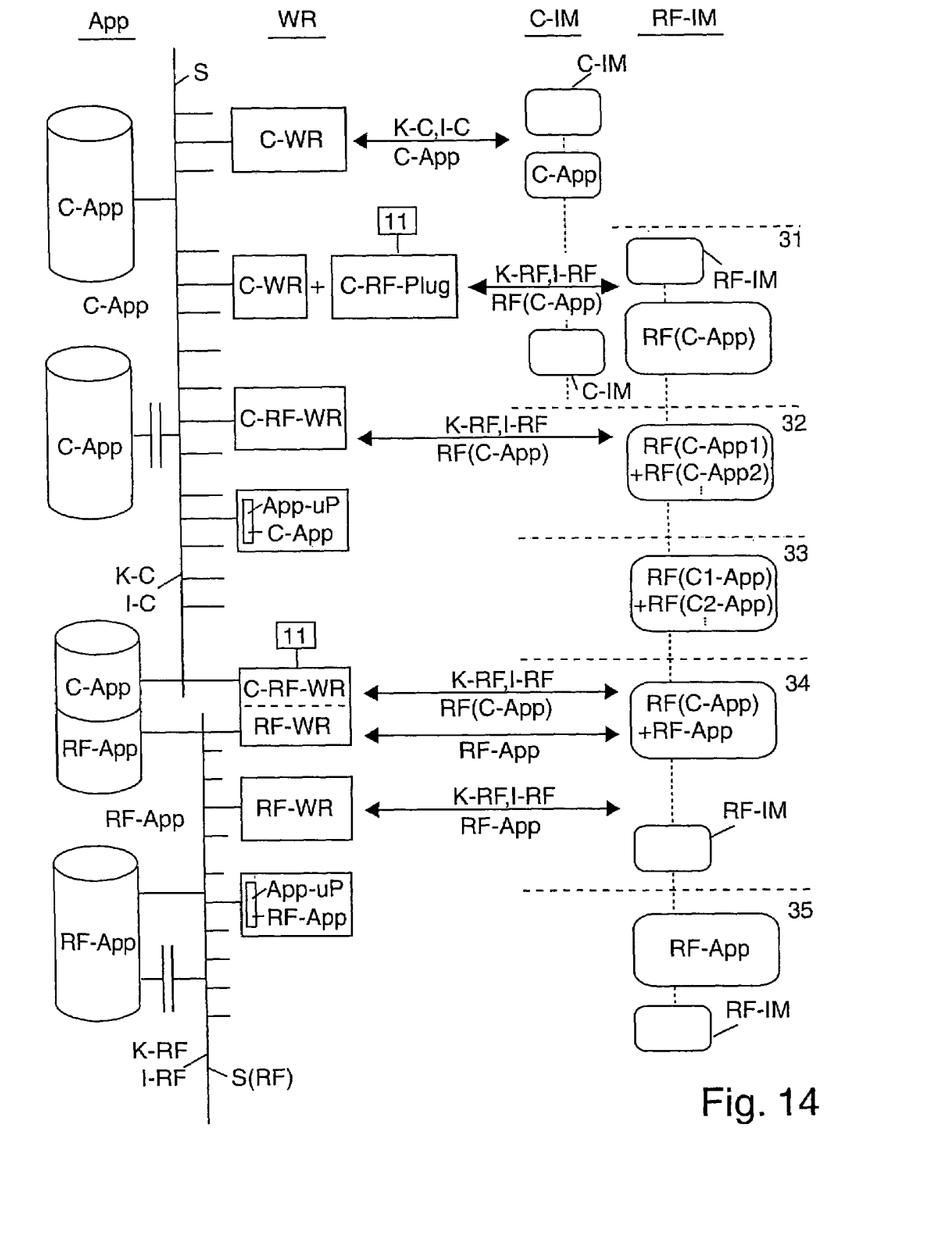

With the schematically depicted installation according to FIG. 14, the universal applicability of the method in accordance with the invention and with the converter modules C-RF in the contact-less read/write stations is further illustrated. This installation comprises host computers H, with applications App, with read/write—/reading stations WR as well as with identification media IM. FIG. 14 illustrates (represented from top to bottom) the possible step-by-step introduction of initialized contact-less identification media RF-IM with assigned initialized contact-less read/write stations C-RF-WR, resp., C-RF-Plug and the expansion or the extension of applications up to a possible partial or complete transformation of the original contact card system with contact communication K-C into a contact-less system with contact-less identification media RF-IM and contact-less communication K-RF, I-RF. This installation in possible extension stages illustrates from top to bottom host computer H with contact applications C-App, a contact interface S with contact communication K-C, I-C, complemented by contact applications C-App in application computers App-uP of the read/write stations WR. These can be complemented by host computers with contact-less applications RF-App and with a contact-less interface S(RF) with contact-less communication K-RF, I-RF.

With respect to the assigned read/write stations WR, one first departs from a pure contact card system with contact card read/write stations C-WR (e.g., in accordance with FIGS. 1a, 1b). This is complemented with initialized plug-in modules C-RF-Plug capable of being plugged into the existing contact card reading stations (e.g., according to FIGS. 2a, 2b)
as well as with initialized contact-less read/write stations C-RF-WR (in accordance with FIGS. 3a, 3b),
with combined stations C-RF-WR and RF-WR (according to FIGS. 4b, 5b)
and finally with pure contact-less read/write stations RF-WR (without the necessary converter module C-RF).

With regard to the identification media, possible expansion stages 31–35 are illustrated:

The existing installation only comprises contact identification media C-IM.

With the stage 31, in accordance with the invention additional initialized contact-less identification media RF-IM with a contact application in RF—language RF(C-App) are introduced.

In stage 32, RF-IM media are introduced, which contain several contact applications RF(C-App1), RF(C-App2).

In stage 33, RF-IM media are introduced, which contain more than one type of contact application with different kinds of contact communication K-C1, K-C2, (e.g., of different independent operators): RF(C1-App), RF(C2-App).

In stage 34, RF-IM media are introduced, which in addition to the contact applications RF(C-App) also contain pure contact-less applications RF-App.

Finally in stage 35 contact-less identification media RF-IM are introduced, which only contain contact-less applications RF-App.

These described expansion stages 31–35 in principle are capable of being implemented on any contact-less identification medium RF-IM, in that new applications are introduced and old applications are deleted, i.e., the contact-less identification media do not have to be replaced.

In parallel to this expansion, with respect to the contact-less identification media RF-IM and the applications contained therein (this also with regard to the number of media utilized), the assigned read/write stations may also be expanded and, if so required, also replaced step-by-step.

This results in a step-by-step transformation of a system with contact card applications into a contact-less system—without it being necessary to re-write the rules and protocols of a contact card communication in the system on the level of the host to the rules and protocols of a contact-less communication.

The new method in accordance with the invention for the introduction of contact-less identification media RF-IM comprises essential advantages:
  the existing contact system may continue to be utilised,
  only small investment steps are required with correspondingly low costs;—mistakes during the introduction and the risk of failures are substantially reduced,
  the expansion steps, e.g., with plug-in modules C-RF-Plug are capable of being temporarily set up, tested and also replaced and changed again,
  depending on the requirements and needs, almost any expansion—and adaptation steps are possible, this also with respect to the applications.

An important advantage, above all, is also the fact that the contact-less identification media RF-IM may contain several, in particular also several independent applications, wherein this also includes several types of contact communication and contact-less communication (K-C1, K-C2 and K-RF1, K-RF2). For a user it is important, that with an identification medium of this kind he is able to cover several applications for his required fields of application and this in principle in any combination.

Applications of this kind, which are carried out at corresponding contact-less read/write stations C-RF-WR with appropriate dialogue devices 11, for example, are local and temporal access control, access to devices of the information—and communications technology (computers, video-phones/picture-phones) and to IT—applications (data bases, networks, encryption techniques) as well as credit—and check—or value card applications.

Examples for the practical application of contact-less identification media may be: local access to secure rooms and to computer work places (Personal IT Access), access to networks and secure data bases, access to cash registers in shopping centres for the cashier, the obtaining of services and goods, e.g., at service stations and automatic food vending machines, multiple entrance cards for sports—and leisure facilities, parking buildings and for public transport, etc.

Preferably, an appropriate authorization system suitable for an installation or for a system of installations is defined, which at least records and administers all contact-less identification media RF-IM with all applications (RF(C-App) and RF-App) contained therein. In addition, contact applications of contact media C-IM and read/write stations belonging to these may also be recorded and administered.

For the application special advantages result, if a hierarchical authorization system A is defined, which ensures the utilization and description of the contact-less identification media RF-IM with independent, mutually non-influenceable applications, wherein the independent proprietors of the applications are capable of at any time autonomously and independently registering and also changing in the contact-less identification media RF-IM.

An authorization system A of this type, e.g., is described in the WO97/34265 for a contact-less communication system with contact-less applications. Here a hierarchical authorization system applicable to all identification media and to all assigned read/write stations is defined, with which every identification medium has to be initialized and with which the mutual non-influenceability of all independent applications is assured and wherein a proprietor of an independent application authorized by the proprietor of the system at any time is able to autonomously register his application in new identification media and in identification media, which already contain other independent applications. This also independent of the agreement of a central station of the proprietor of the system.

Within the framework of this description, the following designations are employed:

| | |
|---|---|
| C- | contact - |
| RF- | contact-less - |
| C-IM | contact cards, - identification media, (application media) |
| RF-IM | contact-less identification media (application media) |
| C-RF | converter module = 1 + 2 + 3 |
| C-RF-WR | RF - read/write station with converter module |
| C-RF-Plug | converter module as plug-in module in C-WR |
| C-WR | contact card reading station, resp., read/write station |
| RF-WR | contact-less reading station, resp., read/write station |
| H | host computer |
| K | communication |
| I | information |
| K-C, I-C | contact communication and - information |
| K-RF, I-RF | contact-less communication and information |
| RF-App | RF - application |
| C-App | contact (card) - application |

-continued

| | |
|---|---|
| RF(C-App) | C - application in RF - language |
| App-uP | application computer |
| cryp | encryption of the RF - communication |
| shad | shadow memory in RF-IM, C-RF-WR |
| S | contact card interface |
| S(RF) | interface for contact-less communication |
| A | authorization system |
| UA | sub-authorization system |
| AE | authorization element |
| AE-RF | RF - authorization element |
| AE-C | contact authorization element |
| A-RF-IM | RF - authorization medium |
| A-C-IM | contact authorization medium |
| A-C-RF-WR | authorization read/write station |
| A-I | authorization information |
| A-I-RF, A-I-C | RF - , resp., C - authorization information |
| KW | means for the selection of the type of communication (C, Ci or RF) |
| N | network |
| Ini, (Ini) | initialisation, initialized |
| Ini-I | initialisation information |
| Ini-A-I | Ini-I within the scope of an authorization system A |
| (Ini-A) | initialized within the scope of A |
| (Ini-UA1) | initialized within the scope of UA1 |
| Ini-RF-IM | contact-less initialisation identification medium |
| Ini-C-IM | initialisation contact medium |
| 1 | C - communication part |
| 2 | C/RF - translation part |
| 3 | RF - communication part |
| 4 | RF - transmitter/receiver (set) |
| 5 | RF - antenna |
| 6 | contacts to C-WR |
| 7 | connections to S |
| 8 | power supply |
| 9 | energy store |
| 10 | power control, - amplification |
| 11 | dialogue device |
| 12 | display |
| 13 | input keyboard |
| 14 | biometric identification, sensor |
| 15 | PIN - code |
| 31–35 | expansion stages with respect to RF-IM |

The invention claimed is:

1. A method for operating contact-less identification media (RF-IM) in a system with a contact application (C-App) for contact cards (C-IM), wherein an initialized (Ini) converter module (C-RF) is connected in series, which on the one hand carries out a contact-less communication (K-RF) with initialized (Ini) contact-less identification media (RF-IM) and, on the other hand, carries out a contact communication (K-C) at a contact card interface (S) to a host computer (H) or to an application computer (App-uP) of a contact read/write station (C-WR) for the communication with a contact application (C-App) of the system and which, with respect to communication rules and information (I-RF), translates the contact-less communication (K-RF) into a contact communication (K-C) with contact information (I-C) and vice versa and wherein the initialization of the converter module (C-RF) is defined, administered and executed within the scope of a hierarchic authorization system (A).

2. The method according to claim 1, wherein the converter module (C-RF) also comprises a means (KW) for the selection of the type of communication between different types of contact communications (K-C1, K-C2) and contact-less communications (K-RF1, K-RF2).

3. The method according to claim 2, wherein the selection of the communication is automatically implemented in correspondence with the application (C1-App, C2-App, RF1-App, RF2-App).

4. The method according to claim 2, wherein the type of the communication is selected according to a request from the side of the system including the host (H) or of the application computer (App-uP).

5. The method according to claim 2, wherein the type of the communication is selected according to a request from the side of the system including the identification medium (RF-IM).

6. The method according to claim 1, wherein the converter module (C-RF) is directly connected to the interface (S) and is implemented as an initialized (Ini) read/write station (C-RF-WR).

7. The method according to claim 1, wherein the converter module (C-RF) is implemented as an initialized (Ini) plug-in module (C-RF-Plug) capable of being plugged into an existing contact read/write station (C-WR) and as a contact-less reading station.

8. The method according to claim 1, wherein the converter module (C-RF) is driven by a contact application (C-App) from an assigned host (H) or an application computer (App-uP) according to rules and protocols of a standardised contact communication (K-C) with standardised contact information (I-C), and vice versa, and that the converter module (C-RF) responds to the contact application (C-App) according to the same rules and protocols and vice versa.

9. The method according to claim 8, wherein the converter module (C-RF) is driven by, and responds in accordance with, standardisation protocols according to national or international organisations such as ISO, IEC, IEEE, ANSI, CEN or CENELEC.

10. The method according to claim 1, wherein, for writing processes in case of the contact-less communication (K-RF) from the converter module (C-RF) to the contact-less identification media (RF-IM) shadow memories (shad) in the identification media and/or on the converter module are utilized.

11. A method for operating contact-less identification media (RF-IM) in a system with a contact application (C-App) for contact cards (C-IM), wherein an initialized (Ini) converter module (C-RF) is connected in series, which on the one hand carries out a contact-less communication (K-RF) with initialized (Ini) contact-less identification media (RF-IM) and, on the other hand, carries out a contact communication (K-C) at a contact card interface (S) to a host computer (H) or to an application computer (App-uP) of a contact read/write station (C-WR) for the communication with a contact application (C-App) of the system and which, with respect to communication rules and information (I-RF), translates the contact-less communication (K-RF) into a contact communication (K-C) with contact information (I-C) and vice versa, wherein, a contact application (C-App) is registered into contact-less identification media (RF-IM) by means of an authorization read/write station (A-C-RF-WR) which comprises a converter module (CR-F) and an authorization element (AE) including authorization information (A-I) and wherein the rules for the registration are defined in a hierarchic authorization system (A, UA1, UA2).

12. The method according to claim 11, wherein the authorization information (A-I) is transferred to the authorization read/write station (A-C-RF-WR) by means of a mobile contact authorization medium (A-C-IM).

13. The method according to claim 11, wherein the authorization information (A-I) are transferred to the authorization read/write station (A-C-RF-WR) by means of a mobile contact-less authorization medium (A-RF-IM).

14. The method according to claim 11, wherein the authorization information (A-I) is transferred to the authorization read/write station (A-C-RF-WR) through a network (N).

15. A converter module for contact-less communication (K-RF) with initialized (Ini) contact-less identification media (RF-IM) in a system with a contact card application (C-App) and with contact communication rules, characterised in that the converter module (C-RF) is initialized (Ini) and
 on the one hand, comprises a part (1), which carries out a contact communication (K-C, I-C) at a contact card interface (S) to a host computer (H) or to an application computer (App-uP) of a contact read/write station (C-WR)
 on the other hand, comprises a part (3), which carries out the contact-less communication (K-RF, I-RF) to the contact-less identification media (RF-IM)
 and comprises a part (2) as translation part (C/RF), which translates the contact-less communication (K-RF, I-RF) into the contact communication (K-C, I-C)
and wherein the initialization of the converter module (C-RF) is defined, administered and executed within the scope of a hierarchic authorization system (A).

16. The converter module according to claim 15, wherein the converter module (C-RF) also comprises an RF—transmitter/receiver (4) with an antenna (5) for the contact-less communication (K-RF) with contact-less identification media (RF-IM).

17. The converter module according to claim 15, wherein an energy store (9) is provided.

18. The converter module according to claim 15, wherein means for autonomous power supply are provided.

19. The converter module according to claim 15, wherein means for power control and amplification (10) are provided.

20. The converter module according to claim 15, wherein the converter module is assigned a dialogue device (11) for execution of applications.

21. The converter module according to claim 20, wherein the dialogue device (11) comprises one of the following elements: a display (12), an input keyboard (13), a biometric identification (14), or a PIN code (15).

22. The converter module according to claim 15, wherein the converter module is assigned an application computer (App-uP) for the execution of an application (App), independent of a direct on-line connection to a host (H).

23. The converter module according to claim 16, wherein the RF—transmitter/receiver (4) comprises an encryption (cryp) and/or a shadow memory (shad).

24. The converter module accord to claim 15, wherein the converter module comprises a contact interface (S) to contact applications (C-App) and with this forms a contact-less read/write station (C-RF-WR).

25. The converter module according to claim 24, wherein the contact-less read/write station (C-RF-WR) comprises additional means for the contact-less communication (K-RF, I-RF) with contact-less applications (RF-App) at an interface S(RF).

26. The converter module according to claim 15, wherein the converter module comprises a contact (6) and is implemented as a plug-in module (C-RF-Plug), which is capable of being plugged into an existing contact read/write station (C-WR).

27. The converter module according to claim 15, wherein the RF—communication part (3, 4) is implemented for the contact-less communication with contact-less identification media (RF-IM), which contain several independent applications (App1, App2).

28. The converter module according to claim 15, wherein the converter module (C-RF) is integrated in an application computer (App-uP).

29. An installation with a host (H), a contact interface (S), contact read/write stations (C-WR) and contact identification media (C-IM), wherein initialized (Ini) converter modules (C-RF) are provided for the contact-less communication with additional initialized (Ini) contact-less identification media (RF-IM), wherein the converter modules (C-RF) on the one hand carry out a contact communication (K-C, I-C) to the interface S of the contact system and on the other hand carry out a contact-less communication (K-RF, I-RF) to the contact-less identification media (RF-IM) and which translate the contact-less communication into the contact communication, and vice versa and wherein the initialization of the converter module (C-RF) is defined, administered and executed within the scope of a hierarchic authorization system (A).

30. The installation according to claim 29, wherein contact-less identification media (RF-IM) with several independent applications (App1, App2) are provided, which communicate with the applications through the converter modules (C-RF).

31. The installation according to claim 29, wherein, in addition to the contact system with contact applications (C-App) and contact communication (K-C, I-C) at an interface (S), also a contact-less system with contact-less applications (RF-App) and contact-less communication (K-RF, I-RF) at an interface (S(RF)) is provided with contact-less reading stations (RF-WR) and with contact-less identification media (RF-IM), which contain several independent applications (RF-App).

32. The installation according to claim 29, wherein the authorization system also administers at least all contact-less identification media (RF-IM) with all applications contained therein.

33. The installation according to claim 29, wherein the hierarchic authorization system (A) assures the utilization and registration of the contact-less identification media (RF-IM) with independent, mutually non influenceable applications, wherein the independent proprietors of the applications are able at any time to autonomously and independently register and also change their applications in the contact-less identification media (RF-IM).

34. The installation according to claim 29, wherein the following applications with corresponding dialogue devices (11) are provided: local and temporal access control, access to devices of the information—and communications technology (computers, videophones/picture-phones) and to IT—applications (data bases, networks, encryption techniques), credit and cheque—or value card applications.

35. A converter module for contact-less communication (K-RF) with initialized (Ini) contact-less identification media (RF-IM) in a system with a contact card application (C-App) and with contact communication rules, characterized in that the converter module (C-RF) is initialized (Ini) and on the one hand comprises a part (1), which carries out a contact communication (K-C, I-C) at a contact card interface (S) to a host computer (H) or to an application computer (App-uP) of a contact read/write station (C-WR)

on the other hand comprises a part (3), which carries out the contact-less communication (K-RF, I-RF) to the contact-less identification media (RF-IM)

and comprises a part (2) as translation part (C/RF), which translates the contact-less communication (K-RF, I-RF) into the contact communication (K-C, I-C)

and wherein a contact card operating system at least partially is integrated into the converter module (C-RF) and said converter module ensures the compliance with the rules of a hierarchic authorization system (A, UA1, UA2).

* * * * *